(12) United States Patent
Gu et al.

(10) Patent No.: US 11,719,281 B2
(45) Date of Patent: Aug. 8, 2023

(54) SEALING ASSEMBLY FOR ROLLING-ELEMENT BEARING, ROLLING-ELEMENT BEARING AND DUSTPROOF ASSEMBLY

(71) Applicants: AKTIEBOLAGET SKF, Gothenburg (SE); PEER Bearing Company, Waukegan, IL (US)

(72) Inventors: Xianbing Gu, Xinchang (CN); Louis J Lenick, Mount Prospect, IL (US); Xingzheng Li, Xinchang (CN); Changsheng Li, Xinchang (CN)

(73) Assignees: PEER BEARING COMPANY, Waukegan, IL (US); AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/527,384

(22) Filed: Nov. 16, 2021

(65) Prior Publication Data
US 2022/0196074 A1 Jun. 23, 2022

(30) Foreign Application Priority Data
Dec. 18, 2020 (CN) .......................... 202011502218.9

(51) Int. Cl.
*F16C 33/78* (2006.01)
*F16C 33/72* (2006.01)
(Continued)

(52) U.S. Cl.
CPC .......... *F16C 33/7866* (2013.01); *F16C 19/06* (2013.01); *F16C 23/084* (2013.01);
(Continued)

(58) Field of Classification Search
CPC .. F16C 23/084; F16C 33/723; F16C 33/7823; F16C 33/7826; F16C 33/7853;
(Continued)

(56) References Cited

U.S. PATENT DOCUMENTS 4,252,329 A * 2/1981 Messenger ........... F16J 15/3264
277/565
4,770,424 A * 9/1988 Otto ..................... F16C 33/7879
277/423

(Continued)

*Primary Examiner* — James Pilkington
(74) *Attorney, Agent, or Firm* — J-Tek Law PLLC; Scott T. Wakeman; Mark A. Ussai

(57) ABSTRACT

A sealing assembly for a rolling-element bearing includes a first seal element and a second seal element, the first seal element including a first support member mounted on a first bearing ring, a first seal body extending radially from the first support member and having an oblique side surface, and at least one first seal lip extending radially from the first seal body to the second ring to form a first seal and the second seal element including a second support portion mounted on the second ring, a second seal body projecting from the second support portion and at least one second seal lip extending from the second seal body to the oblique side surface to form a second seal. A buffer member extends from the first seal element toward the second seal element and has first and second radially spaced annular ribs that extend toward the second seal element.

16 Claims, 3 Drawing Sheets

(51) Int. Cl.
*F16C 19/06* (2006.01)
*F16C 23/08* (2006.01)

(52) U.S. Cl.
CPC ........ *F16C 33/723* (2013.01); *F16C 33/7823* (2013.01); *F16C 33/7853* (2013.01)

(58) Field of Classification Search
CPC .............. F16C 33/7859; F16C 33/7863; F16C 33/7866; F16C 33/7883
See application file for complete search history.

(56) References Cited

U.S. PATENT DOCUMENTS

| | | | | |
|---|---|---|---|---|
| 5,711,618 | A * | 1/1998 | Waskiewicz | .......... F16C 35/045 |
| | | | | 384/489 |
| 7,258,491 | B2 * | 8/2007 | Gutowski | ............. F16C 33/805 |
| | | | | 384/480 |
| 9,771,981 | B2 * | 9/2017 | Baracca | ............. F16C 33/7866 |
| 11,209,050 | B1 * | 12/2021 | Chang | ................... F16C 33/782 |

* cited by examiner

SEALING ASSEMBLY FOR ROLLING-ELEMENT BEARING, ROLLING-ELEMENT BEARING AND DUSTPROOF ASSEMBLY

TECHNICAL FIELD

The present disclosure relates to a sealing assembly for a rolling-element bearing, in particular to a maintenance-free sealing assembly for a rolling-element bearing. The present disclosure relates to a rolling-element bearing having a sealing assembly as described above. The present disclosure relates to a dustproof assembly that houses a rolling-element bearing having a sealing assembly as described above.

BACKGROUND

Conventionally, a single seal is usually arranged between the inner ring and the outer ring of a rolling-element bearing to prevent a loss of lubricant. However, due to leakage of lubricant caused by insufficient sealing, there is still a need to replenish lubricant regularly.

SUMMARY

According to one aspect of the present disclosure, a sealing assembly is provided for a rolling-element bearing, which rolling-element bearing comprises an outer ring, an inner ring and rolling elements held between the outer ring and the inner ring by a cage. The sealing assembly is disposed between the outer ring and the inner ring.

The sealing assembly comprises a first sealing member, a second sealing member and a buffer member, and the buffer member acts between the first sealing member and the second sealing member.

When an interference fit is formed between the buffer member and the abutting first sealing member or the second sealing member, the interference amount should be smaller than a first threshold value to avoid damaging the buffer member due to an excessive amount of interference.

The first threshold value may be for example (but is not limited to) 0.1 mm. The first threshold value is based on the product size of the sealing assembly. If the product size changes, the first threshold value will change accordingly.

When a clearance fit is formed between the buffer member and the abutting first sealing member or the second sealing member, the clearance should be smaller than a second threshold value to ensure the sealing effect.

The second threshold value may be, for example (but is not limited to) 0.1 mm. The second threshold value is based on the product size of the sealing assembly. If the product size changes, the second threshold value will change accordingly.

The first sealing member and the second sealing member are arranged side by side and interact with each other.

The application of the double sealing assembly can reduce the leakage of lubricant, thus prolonging the maintenance cycle and the time between lubricant replenishment.

According to the above aspect of the present disclosure, the first sealing member and the second sealing member are arranged side by side with respect to each other substantially along the axial direction of the rolling-element bearing.

According to the above aspects of the present disclosure, the first sealing member includes a first supporting portion and a first sealing lip provided on the first supporting portion. The first sealing lip abuts against the radially outer surface of the inner ring.

According to the above aspects of the present disclosure, the first supporting portion includes a first bending part, a first radial part, and a first connecting part connected between the first bending part and the first radial part. The first sealing lip is formed on inner surfaces of the first radial part and the first connecting part facing the rolling element. The first bending part is clamped in an outer ring matching groove arranged on the outer ring.

According to the above aspects of the present disclosure, the second sealing member includes a second supporting portion and a second sealing lip disposed on the second supporting portion. The second sealing lip abuts against the first supporting part.

According to the above aspects of the present disclosure, the second supporting portion includes a second inclined part, a second axial part, and a second radial part connected between the second inclined part and the second axial part. The second sealing lip is formed on the inner surfaces of the second inclined part and the second radial part facing the first sealing member. The second axial part is fixedly arranged on the outer surface of the inner ring.

According to the above aspects of the present disclosure, the second sealing lip abuts against the first connecting part.

According to the above aspects of the present disclosure, each of the first sealing lip and the second sealing lip includes at least two sealing lip branches arranged side by side with respect to each other and spaced apart from each other.

According to the above aspect of the present disclosure, the buffer member is provided on one of the first radial part and the second radial part. The buffer member abuts against the other of the first radial part and the second radial part. The buffer member is located between the first radial part and the second radial part.

According to the above aspects of the present disclosure, the first radial part and the second radial part are arranged in parallel with respect to each other, while the first connecting part and the second inclined part are arranged substantially parallel to each other. The end of the first bending part is adjacent to the end of the second inclined part.

Based on the above structure of the present disclosure, the multiple seal structure formed by the first sealing lip, the buffer member and the second sealing lip is arranged in the labyrinth sealing path formed by the first sealing member, the second sealing member, the inner ring and the outer ring, which greatly reduces the leakage of lubricant compared with the previous solutions.

A further aspect of the disclosure comprises a sealing assembly for a rolling-element bearing, the rolling-element bearing comprising a first ring, a second ring and rolling elements held between the first ring and the second ring by a cage. The sealing assembly is arranged between the first ring and the second ring and includes a first seal element and a second seal element. The first seal element has a first support member mounted on and rotationally fixed relative to the first ring, a first seal body extending radially from the first support member and having an oblique side surface, and at least one first seal lip extending radially from the first seal body to the second ring to form a first seal. The second seal element has a second support portion mounted on and rotationally fixed to the second ring, a second seal body projecting from the second support portion and at least one second seal lip extending from the second seal body to the oblique side surface to form a second seal. The assembly also includes a buffer member extending from the first seal element toward the second seal element, the buffer member including a first annular rib radially spaced from a second annular rib by an axially facing circumferential channel. The ribs form either a gap seal or an axial contact seal with the second seal element.

According to another aspect of the present disclosure, there is provided a rolling-element bearing comprising an outer ring, an inner ring and rolling elements held between the outer ring and the inner ring by a cage, and a sealing assembly which is described above and provided between the outer ring and the inner ring. The first sealing member of the sealing assembly is in direct mutual contact with the outer ring and the inner ring. The second sealing member of the sealing assembly is in direct contact with the inner ring and the first sealing member.

According to another aspect of the present disclosure, a dustproof assembly is provided, which comprises a dustproof cover and an end cover. The end cover is fitted on the dustproof cover, and a sealing ring is arranged between the end cover and the dustproof cover. A bearing seat is provided on the inner surface of the dust cover, and a rolling-element bearing comprising the sealing assembly as described above is arranged on the bearing seat.

So far, in order that the detailed description of this disclosure can be better understood and the contribution of this disclosure to the state of art can be better recognized, this disclosure has summarized the contents of this disclosure quite broadly. Embodiments of the present disclosure will be described below; however, the invention is defined by the claims appended to this application.

Likewise, those skilled in the art will recognize that the concept on which this disclosure is based can be easily used as a basis for designing other structures, methods and systems for carrying out several purposes of this disclosure. Therefore, it is important that the appended claims should be considered to include such equivalent structures as long as they do not go beyond the spirit and scope of the present disclosure.

BRIEF DESCRIPTION OF THE DRAWINGS

Those skilled in the art will have a better understanding of this disclosure through the following drawings, and the advantages of this disclosure will be more clearly reflected. The drawings described herein are only for illustrative purposes of selected embodiments, not all possible implementations and are intended to limit the scope of the present disclosure.

DETAILED DESCRIPTION

Figure 1:
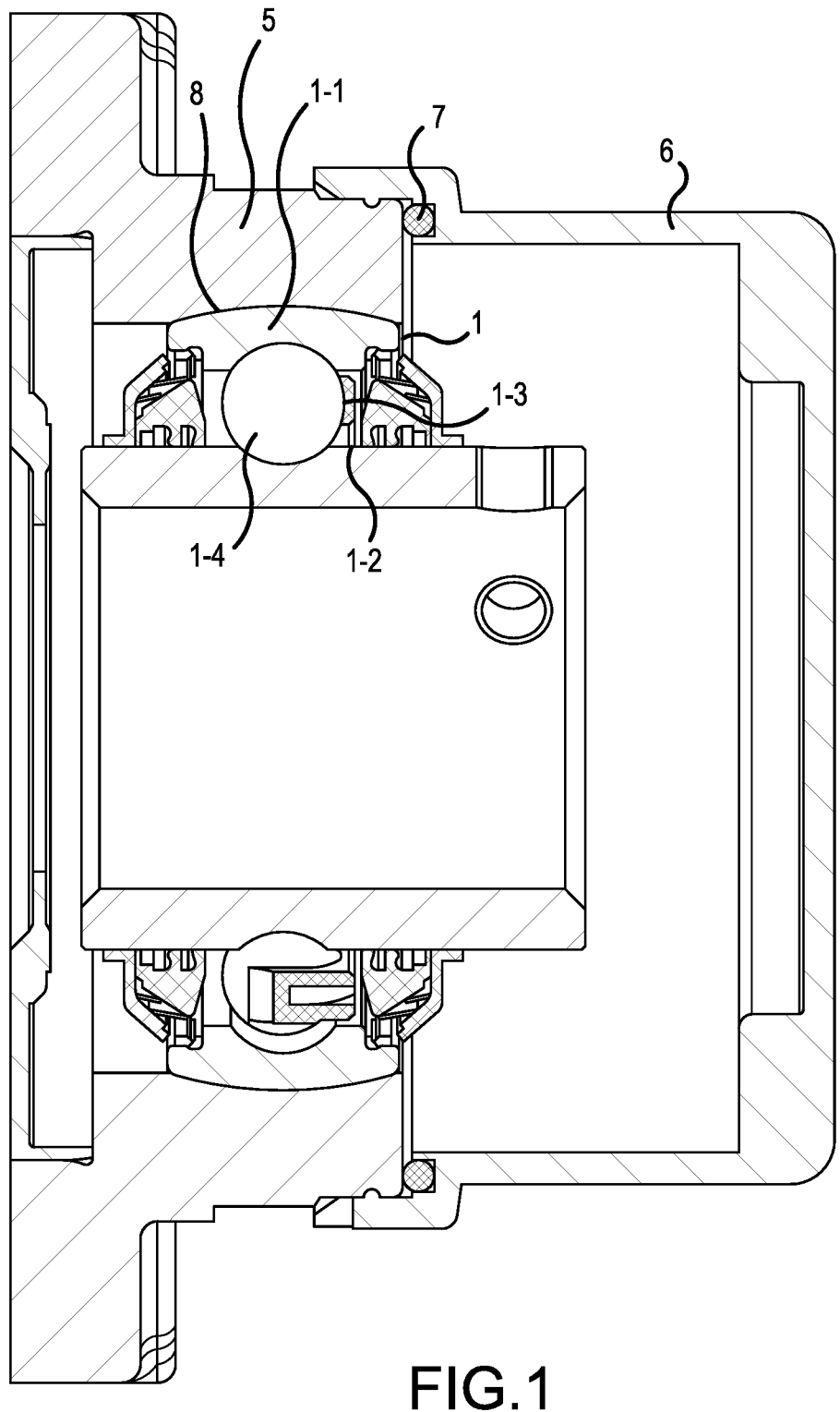
FIG. 1 is a sectional elevations view of a sealing assembly and a dustproof assembly for a rolling-element bearing according to an embodiment of the present disclosure.
Figure 2:
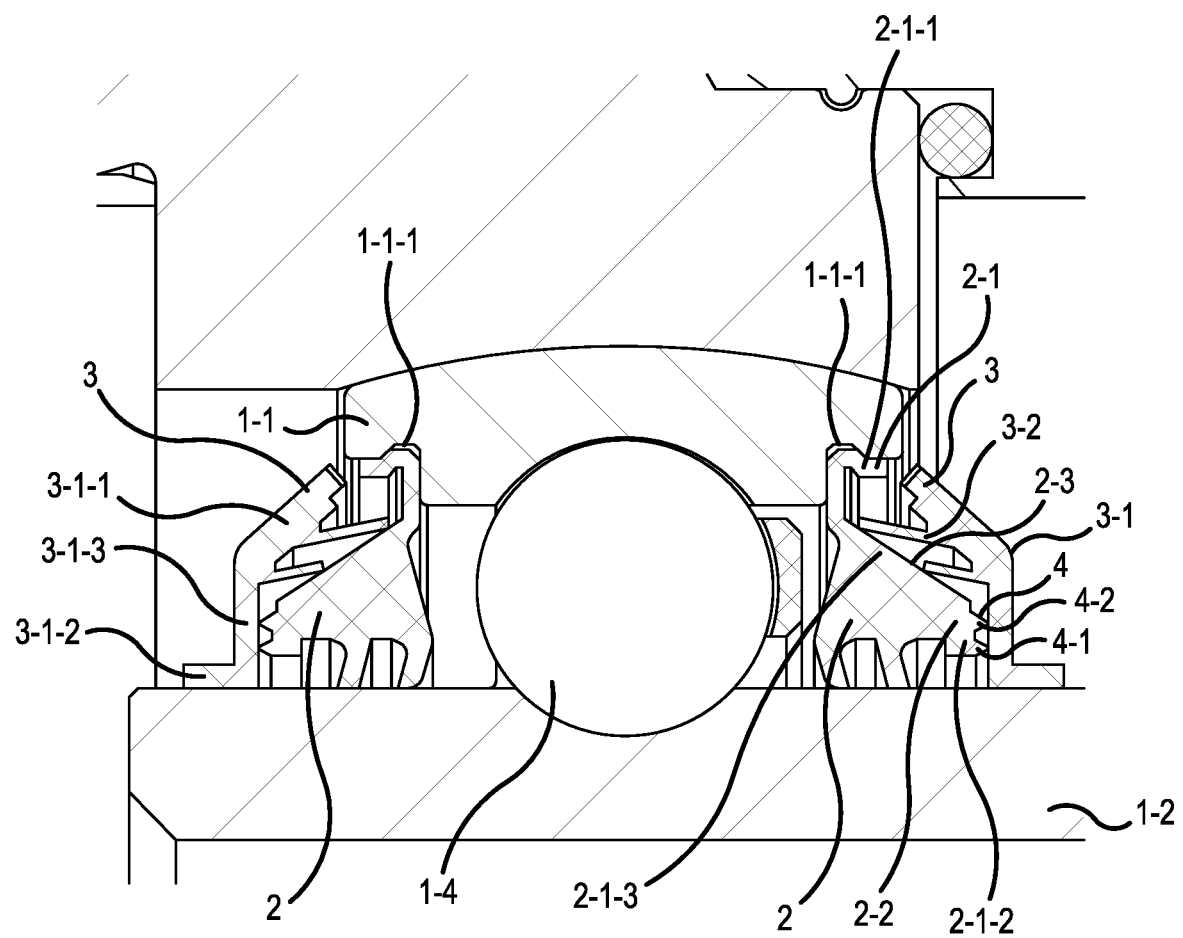
FIG. 2 is an enlarged view of a portion of the sealing assembly of FIG. 1.

With reference to FIG. 1 and FIG. 2, specific embodiments according to the present disclosure will be described in detail below.

According to an embodiment of the present disclosure, as shown in FIG. 1, a sealing assembly for a rolling-element bearing 1 is proposed, which includes an outer ring 1-1, an inner ring 1-2 and a plurality of rolling elements 1-4 held between the outer ring 1-1 and the inner ring 1-2 by a cage 1-3.

In FIG. 1, sealing assemblies according to embodiments of the disclosure are provided on both sides of rolling elements 1-4.

As shown in FIG. 2, the sealing assembly includes a first sealing member 2 and a second sealing member 3. The first sealing member 2 and the second sealing member 3 both have an annular structure and they are arranged side by side and interact with each other. The use of this double sealing assembly can reduce the leakage of lubricant, thus prolonging the maintenance cycle and increasing the time between lubricant replenishment.

According to the above embodiment of the present disclosure, as shown in FIG. 2, the first sealing member 2 and the second sealing member 3 are arranged side by side with respect to each other along the axial direction of the rolling-element bearing 1.

According to the above embodiments of the present disclosure, the first sealing member 2 includes a first supporting portion 2-1 and a first sealing lip 2-2 provided on the first supporting portion 2-1. The first supporting portion 2-1 includes an oblique side surface 2-3.

The first sealing lip 2-2 abuts against the radially outer surface of the inner ring 1-2.

According to the above embodiments of the present disclosure, the first supporting portion 2-1 includes a first bending part 2-1-1, a first radial part 2-1-2 and a first connecting part 2-1-3 connected between the first bending part 2-1-1 and the first radial part 2-1-2.

The first sealing lip 2-2 is formed on the inner surfaces of the first radial part 2-1-2 and the first connecting part 2-1-3 facing the rolling element 1-4.

The first bending part 2-1-1 is engaged in an outer ring matching groove 1-1-1 provided in the outer ring 1-1.

According to the above embodiments of the present disclosure, the second sealing member 3 includes a second supporting portion 3-1 and a second sealing lip 3-2 provided on the second supporting portion 3-1. The second sealing lip 3-2 abuts against the oblique side surface 2-3 of the first supporting portion 2-1 of the first sealing member 2.

According to the above embodiments of the present disclosure, the second supporting portion 3-1 includes a second inclined part 3-1-1, a second axial part 3-1-2 and a second radial part 3-1-3 connected between the second inclined part 3-1-1 and the second axial part 3-1-2.

The second sealing lip 3-2 is formed on the inner surfaces of the second inclined part 3-1-1 and the second radial part 3-1-3 facing the first sealing member 2.

The second axial part 3-1-2 is fixedly disposed on the radially outer surface of the inner ring 1-2.

According to the above embodiments of the present disclosure, the second sealing lip 3-2 abuts against the first connecting part 2-1-3.

According to the above embodiments of the present disclosure, each of the first sealing lip 2-2 and the second sealing lip 3-2 includes two sealing lip branches arranged side by side with respect to each other and spaced apart from each other.

The first supporting portion 2-1 and the second supporting portion 3-1 are made of metal materials.

The first sealing lip 2-2 and the second sealing lip 3-2 are made of an elastic sealing material, such as but not limited to rubber. The materials of the first sealing lip 2-2 and the second sealing lip 3-2 may be the same or different.

Figure 3:
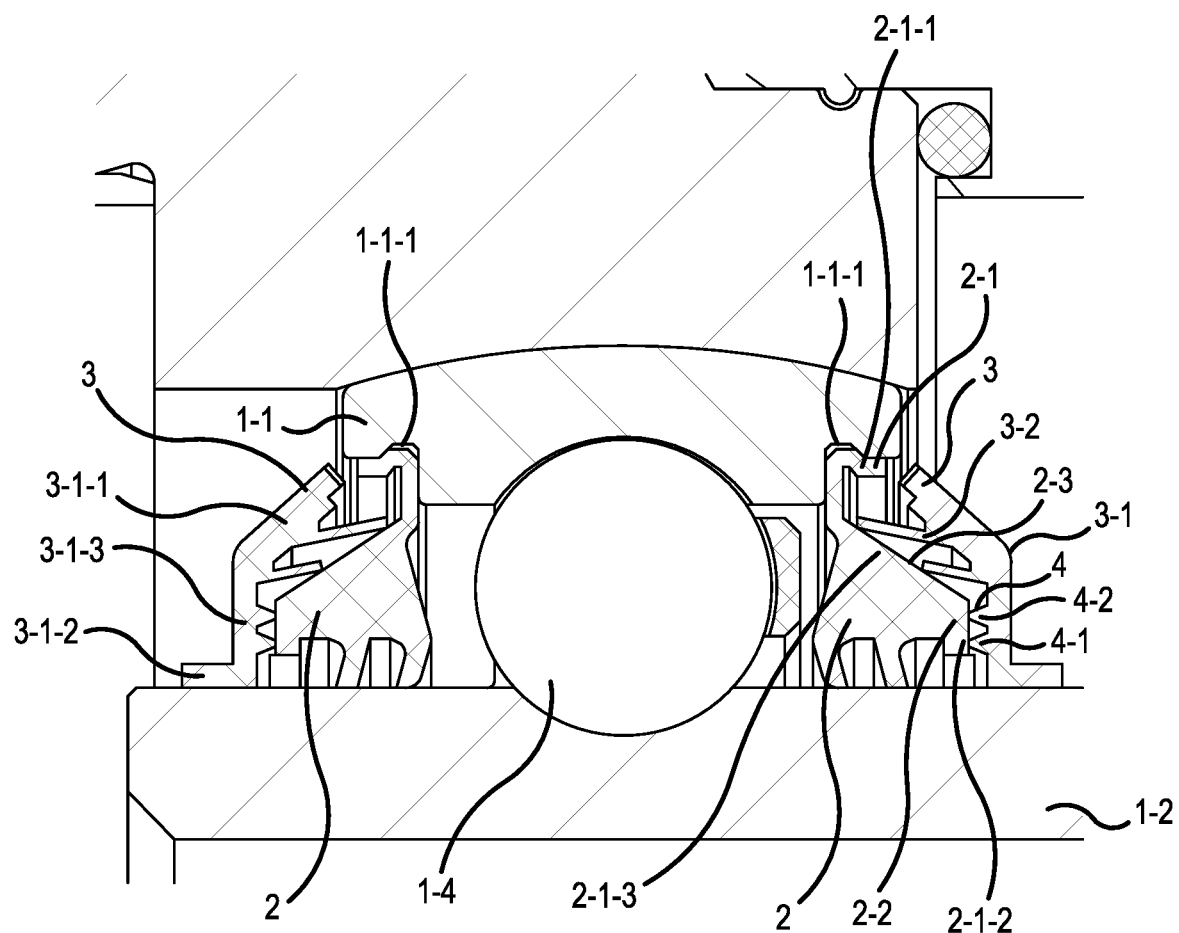
FIG. 3 is a sectional elevational view of a portion of a sealing assembly according to another embodiment.

According to the above embodiment of the present disclosure, the sealing assembly further includes a buffer member 4. The buffer member 4 is provided on the first radial part 2-1-2 as shown in FIGS. 1 and 2 or on the second radial part 3-1-3 as shown in FIG. 3. The buffer member 4 abuts against the other of the first radial part 2-1-2 and the second radial part 3-1-3 and is located between the first radial part 2-1-2 and the second radial part 3-1-3. For example, but without limitation, the buffer member 4 is formed integrally with the first radial part 2-1-2 or the second radial part 3-1-3. As illustrated in FIG. 2, the buffer member 4 may be fixed relative to the first radial part 2-1-2 and include first and second annular ribs 4-1 spaced apart by an annular channel 4-2 which ribs 4-1 may form a gap seal or a contact seal with the second radial part 3-1-3. As illustrated in FIG. 3, the buffer member 4 may be fixed relative to the second radial part 3-1-3 and include first and second annular ribs 3-1-4 that form a gap seal or an annular contact seal with the first radial part 2-1-2.

The buffer member 4 may be made of an elastic or elastomeric material such as, but not limited to, rubber and may have a wavy cross-sectional shape as shown in FIG. 2, but is not limited thereto.

The buffer member 4 acts between the first sealing member 2 and the second sealing member 3. When an interference fit is formed between the buffer member 4 and the abutting first sealing member 2 or second sealing member 3, the interference amount should be smaller than a first threshold value to avoid damaging the buffer member 4 due to excessive interference amount.

The first threshold may be for example (but is not limited to) 0.1 mm. It can be understood by those skilled in the art that the first threshold can be changed based on the change of product size of the sealing assembly.

When a clearance fit is formed between the buffer member 4 and the abutting first sealing member 2 or second sealing member 3, the clearance should be smaller than a second threshold value to ensure the sealing effect. This second threshold value may be for example (but is not limited to) 0.1 mm. It will be understood by those skilled in the art that the second threshold can be changed based on the change of product size of the sealing assembly.

According to the above embodiments of the present disclosure, the first radial part 2-1-2 and the second radial part 3-1-3 are arranged in parallel with respect to each other.

The first connecting part 2-1-3 and the second inclined part 3-1-1 are arranged substantially parallel to each other.

An end of the first bending part 2-1-1 is adjacent to an end of the second inclined part 3-1-1.

Based on the above structure of the present disclosure, the multiple seal structure formed by the first sealing lip 2-2, the buffer member 4 and the second sealing lip 3-2 is arranged in the labyrinth seal path formed by the first sealing member 2, the second sealing member 3, the inner ring 1-2 and the outer ring 1-1, which greatly reduces the leakage of lubricant compared with the previous seals.

According to another embodiment of the present disclosure, as shown in FIG. 1, a rolling-element bearing is disclosed, which includes an outer ring 1-1, an inner ring 1-2, and a rolling element 1-4 held between the outer ring and the inner ring by a cage 1-3. A sealing assembly as described above is provided between the outer ring 1-1 and the inner ring 1-2.

According to another embodiment of the present disclosure, as shown in FIG. 2, the first sealing member 2 of the sealing assembly is in direct contact with the outer ring 1-1 and the inner ring 1-2. The second sealing member 3 of the sealing assembly is in direct contact with the inner ring 1-2 and the first sealing member 2.

According to another embodiment of the present disclosure, the first sealing member 2 includes a first supporting portion 2-1 and a first sealing lip 2-2 disposed on the first supporting portion 2-1. The first sealing lip 2-2 abuts against the radially outer surface of the inner ring 1-2.

According to another embodiment of the present disclosure, the first supporting portion 2-1 includes a first bending part 2-1-1, a first radial part 2-1-2 and a first connecting part 2-1-3 connected between the first bending part 2-1-1 and the first radial part 2-1-2. The first sealing lip 2-2 is formed on the inner surfaces of the first radial part 2-1-2 and the first connecting part 2-1-3 facing the rolling element 1-4. The first bending part 2-1-1 is engaged in an outer ring matching groove 1-1-1 provided in the outer ring 1-1.

According to the above another embodiment of the present disclosure, the second sealing member 3 includes a second supporting portion 3-1 and a second sealing lip 3-2 disposed on the second supporting portion 3-1. The second sealing lip 3-2 abuts against the first supporting part 2-1.

According to another embodiment of the present disclosure, the second supporting portion 3-1 includes a second inclined part 3-1-1, a second axial part 3-1-2 and a second radial part 3-1-3 connected between the second inclined part 3-1-1 and the second axial part 3-1-2.

The second sealing lip 3-2 is formed on the inner surfaces of the second inclined part 3-1-1 and the second radial part 3-1-3 facing the first sealing member 2.

The second axial part 3-1-2 is fixedly disposed on the radially outer surface of the inner ring 1-2.

According to the above another embodiment of the present disclosure, the second sealing lip 3-2 abuts against the first connecting part 2-1-3.

According to another embodiment of the present disclosure, as shown in FIG. 2, a dustproof assembly is proposed, which comprises a dustproof cover 5 and an end cover 6, the end cover 6 is fitted on the dustproof cover 5, and a sealing ring 7 is arranged between the end cover 6 and the dustproof cover 5. The sealing ring 7 may be but is not limited to an O-ring seal. A bearing seat 8 is provided on the inner surface of the dustproof cover 5.

The dust cover 5, the end cover 6 and their mating surfaces will be impacted by a high-pressure water gun in some use cases. The sealing ring 7 can effectively reduce the water flowing under the impact of the high-pressure water gun from entering the inner space defined by the dust cover 5 and the end cover 6.

The rolling-element bearing 1 including the sealing assembly as described above is arranged on the bearing seat 8.

The foregoing disclosure provides illustration and description, but is not intended to be exhaustive or to limit embodiments to the precise form disclosed. Modifications and variations can be made according to the above disclosure or can be obtained from the practice of the embodiments.

Even though specific combinations of features are recited in the claims and/or disclosed in the specification, these combinations are not intended to limit the disclosure of various embodiments. Actually, many of these features can be combined in a manner not specifically disclosed in the specification. Although each dependent claim listed below may directly depend on only one claim, the disclosure of various embodiments includes each dependent claim combined with each other claim in the claim set.

Unless explicitly stated, any element, action or instruction used herein should not be interpreted as critical or necessary. In addition, as used herein, the articles "a" and "an" are intended to include one or more items, and may be used interchangeably with "one or more". Furthermore, as used herein, the article "the" is intended to include one or more items cited in conjunction with the article "the" and may be used interchangeably with "one or more". Furthermore, as used herein, the term "set" is intended to include one or more items (e.g., related items, unrelated items, combinations of related and unrelated items, etc.), and may be used interchangeably with "one or more". When only one item is intended, the phrase "only one item" or similar language is used. In addition, as used herein, the term "having", variations thereof and the like are intended to be open terms. In addition, the phrase "based on" is intended to mean "based at least in part" unless explicitly stated otherwise. In addition, as used herein, the term "or" is intended to be inclusive when used in series, and may be used interchangeably with "and/or" unless otherwise expressly stated (e.g., if used in combination with "or" or only one of them").

What is claimed is:

1. A sealing assembly for a rolling-element bearing, the rolling-element bearing comprising a first ring, a second ring and rolling elements held between the first ring and the second ring by a cage, the sealing assembly being arranged between the first ring and the second ring, the sealing assembly comprising:
   a first seal element having a first support member mounted on and rotationally fixed relative to the first ring, a first seal body extending from the first support member toward the second ring and having an oblique side surface, and at least one first seal lip extending from the first seal body to the second ring to form a first seal;
   a second seal element having a second support portion mounted on and rotationally fixed to the second ring, the second support portion including an angled portion substantially parallel to the oblique side surface and extending axially over the oblique side surface, and at least one second seal lip extending from the angled portion to the oblique side surface to form a second seal, and
   a buffer member extending from the first seal element toward the second seal element or from the second seal element toward the first seal element, the buffer member comprising a first annular rib spaced from a second annular rib by a circumferential channel.

2. The sealing assembly according to claim 1, wherein the buffer member extends from the first seal element toward the second seal element and the first and second ribs are spaced from the second seal element to form a gap seal, or
wherein the buffer member extends from the second seal element toward the first seal element and the first and second ribs are spaced from the first seal element to form the gap seal.

3. The sealing assembly according to claim 2, wherein the first ring is an outer ring.

4. The sealing assembly according to claim 1, wherein the buffer member extends from the first seal element toward the second seal element and the first and second ribs slidably abut the second seal element to form a contact seal, or
wherein the buffer member extends from the second seal element toward the first seal element and the first and second ribs slidably abut the first seal element to form the contact seal.

5. The sealing assembly according to claim 4, wherein the first ring is an outer ring.

6. The sealing assembly according to claim 1, wherein:
the buffer member forms an interference fit or a clearance fit between the first seal element and the second seal element,
when the interference fit is formed between the buffer member and the first seal element or the second seal element, an interference amount is smaller than a first threshold value to avoid damaging the buffer member due to an excessive interference amount,
when the clearance fit is formed between the buffer member and the first seal element or the second seal element, the clearance is smaller than a second threshold value to ensure a sealing effect, and
the first seal element and the second seal element are arranged side by side and interact with each other.

7. The sealing assembly according to claim 6, wherein the first seal element and the second seal element are arranged side by side with respect to each other substantially along an axial direction of the rolling-element bearing.

8. The sealing assembly according to claim 1, wherein:
the first ring is an outer ring and the second ring is an inner ring,
the first support member comprises a first bending part clamped in a groove arranged on the outer ring.

9. The sealing assembly according to claim 8, wherein:
the second support portion comprises an axial part and a radial part, the radial part being connected between the angled portion and the axial part,
the at least one second sealing lip is formed on an inner surface of the angled portion, and
the axial part is fixedly arranged on an outer surface of the inner ring.

10. The sealing assembly according to claim 1, wherein:
the at least one first sealing lip comprises two first sealing lips and the at least one second sealing lip comprises two second sealing lips.

11. The sealing assembly according to claim 1, wherein the at least first seal lip comprises two first seal lips, and
wherein the at least one second seal lip comprises two second seal lips.

12. A rolling-element bearing comprising the sealing assembly according to claim 1.

13. The rolling-element bearing according to claim 12, wherein,
the first seal element of the sealing assembly is in direct contact with the second ring and the first ring; and
the second seal element of the sealing assembly is in direct contact with the second ring and the first seal element.

14. A dustproof assembly comprising:
a dustproof cover,
an end cover mounted on the dustproof cover and connected to the dustproof cover by a sealing ring,
wherein a bearing seat is arranged on an inner surface of the dustproof cover, and
wherein the rolling element bearing according to claim 12 is mounted on the bearing seat.

15. A sealing assembly for a rolling-element bearing, the rolling-element bearing comprising a first ring, a second ring and rolling elements held between the first ring and the second ring by a cage, the sealing assembly being arranged between the first ring and the second ring, the sealing assembly comprising:

a first seal element having a first support member mounted on and rotationally fixed relative to the first ring and a first seal body extending from the first support member toward the second ring, the first seal body having an oblique side surface and at least one first seal lip extending from the first seal body to the second ring to form a first seal;

a second seal element having a second support portion mounted on and rotationally fixed to the second ring and at least one second seal lip extending from the second support portion to the oblique side surface to form a second seal, and a buffer member extending from the second seal element toward the first seal element, the buffer member comprising a first annular rib radially spaced from a second annular rib by an axially facing circumferential channel wherein the first seal body includes a side facing the second support portion, and wherein the first and second ribs are located on the second support portion and extend toward the side of the first seal body that faces the second support portion.

16. The sealing assembly according to claim 15, wherein the first ring is an outer ring.

* * * * *